United States Patent [19]

Kaiser

[11] 4,146,300
[45] Mar. 27, 1979

[54] FIBER OPTIC ECCENTRIC CONNECTOR

[75] Inventor: Manfred Kaiser, Hemmingen, Fed. Rep. of Germany

[73] Assignee: ITT Industries, Inc., New York, N.Y.

[21] Appl. No.: 830,081

[22] Filed: Sep. 2, 1977

[30] Foreign Application Priority Data

Sep. 11, 1976 [DE] Fed. Rep. of Germany ....... 2640973

[51] Int. Cl.$^2$ .............................................. G02B 5/14
[52] U.S. Cl. ................................ 350/96.21; 308/201
[58] Field of Search ................. 350/96.20, 96.21, 247, 350/252; 339/270 R, 274; 308/201

[56] References Cited

U.S. PATENT DOCUMENTS

| 3,800,388 | 4/1974 | Börner et al. ............... 350/96.21 X |
| 3,936,143 | 2/1976 | Sato ................................ 350/96.21 |
| 4,019,806 | 4/1977 | Fellows et al. ................. 350/96.21 |

FOREIGN PATENT DOCUMENTS

| 2358785 | 6/1975 | Fed. Rep. of Germany ........ 350/96.20 |
| 2457165 | 10/1975 | Fed. Rep. of Germany ........ 350/96.21 |

*Primary Examiner*—John K. Corbin
*Assistant Examiner*—John D. Lee
*Attorney, Agent, or Firm*—Thomas L. Peterson

[57] ABSTRACT

A fiber optic connector is disclosed capable of joining in proper alignment the uncentered ends of two optical fibers mounted in ferrules. Each ferrule is rotatably supported inside an eccentric bore of a connector sleeve by means of a rotatable cage whose balls or rollers have different diameters. The two cylindrical connector sleeves are capable of being mated in a connector receptacle with the optical fibers therein adjusted to exact lateral alignment.

5 Claims, 4 Drawing Figures

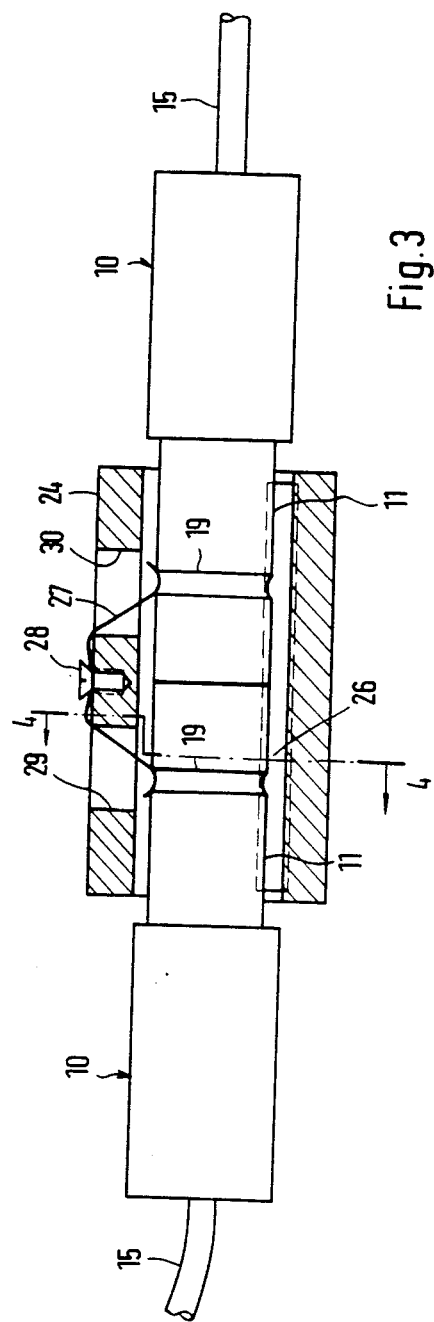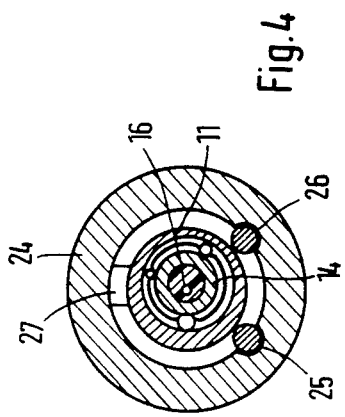

FIBER OPTIC ECCENTRIC CONNECTOR

BACKGROUND OF THE INVENTION

The present invention relates generally to an optical fiber connector and, more particularly, to a connector for accurately laterally aligning single optical fibers.

More specifically, the present invention relates to a connector for joining one end of a single optical fiber to one end of another single optical fiber, in which the fiber ends are each sealed uncentered into a cylindrical ferrule capable of rotating about its axis. Each ferrule is supported in the eccentric cylindrical bore of a cylindrical connector sleeve so that the axes of the ferrule and the connector sleeve will extend parallel in relation to one another. A connector receptacle of the connector serves to connect to one another in proper alignment the cylindrical connector sleeves containing the fiber ends to be joined.

Such a connector has already become known from the German Offenlengungschrift (DT-OS) No. 24 57 165, especially from FIG. 4 thereof. Mutual alignment of the fiber ends to be joined to one another is effected in the known arrangement in that each fiber end is capable of being turned in a double eccentricity about the axis of the connector sleeve. The outer sleeve, i.e. the connector sleeve, is provided on one hand with an eccentric axial bore in which the inner sleeve, i.e. the ferrule in which the fiber is mounted, is rotatably supported. The fiber core is also sealed eccentricallly into the ferrule. In this way, it is possible to effect the alignment with respect to one another of the optical axes of the fiber ends to be joined, but as a rule, they are not brought to coincide with the common center axis of the connector sleeves connected to one another in proper alignment. This has the disadvantage of requiring readjustment after each parting and re-establishment of the connection. Merely in the special case where the eccentricity of the fiber with respect to the ferrule is the same as that of the ferrule with respect to the connector sleeve is it possible to adjust the optical axes of the fiber ends to the center axis of the connector sleeves, so that they, when fixed in this position, will again be exactly in alignment each time the connection is re-established.

Moreover, a surface bearing of the ferrule without any play inside the connector sleeve calls for a high processing accuracy, so that with the exception of laboratory applications, such a solution will hardly ever be suitable for being used from an economical point of view.

It is, therefore, the object of the present invention to provide a connector of the kind mentioned hereinbefore, in which the optical axes of the fiber ends to be joined can always be adjusted to the mechanical center axis of the associated connector sleeve.

SUMMARY OF THE INVENTION

According to the principal aspect of the present invention, there is provided an optical fiber connector member comprising a cylindrical ferrule capable of rotating about its axis and adapted to have an optical fiber mounted eccentrically therein. The ferrule is supported in an eccentric cylindrical bore of a cylindrical connector sleeve so that the axes of the ferrule and connector sleeve will extend parallel in relation to one another. Rotatable cage means mounts the ferrule inside the eccentric, cylindrical bore of the connector sleeve. The rotatable cage means includes at least three rotatable circular elements of which at least one has a diameter differing from that of the others. The axis of the eccentric cylindrical bore of the connector sleeve and the axis of the ferrule are offset laterally with respect to one another. Two of such connector members are capable of being mated in a connector receptacle with the optical fibers therein adjusted to exact lateral alignment.

BRIEF DESCRIPTION OF THE DRAWINGS

FIG. 3 shows the entire connector of the invention partly in longitudinal section; and FIG. 4 shows a sectional view taken along lines 4—4 of FIG. 3.

DESCRIPTION OF THE PREFERRED EMBODIMENT

Figure 1:
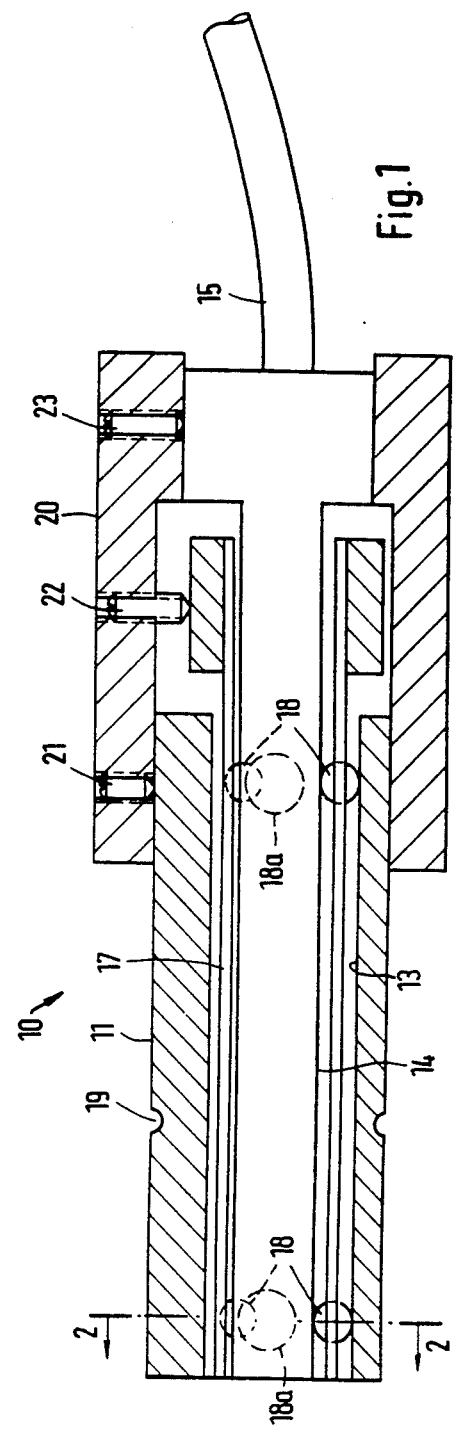
FIG. 1 is a partial longitudinal sectional view through one of the connector members of the invention.

FIG. 1 shows a connector member, generally designated 10, including a cylindrical connector sleeve 11 having an eccentric bore 13 therethrough. In the bore 13, there is positioned a cylindrical ferrule 14 with the sealed-in fiber 15 whose fiber core 16, as a rule, is positioned eccentrically in relation to the center point F of the cross-section of the ferrule 14. According to the invention, the ferrule 14 is supported inside the bore 13 of the connector sleeve 11 by means of a ball cage 17. A minimum of three balls 18 is required in one plane. Two sets of three balls 18 are uniformly distributed about the circumference of the bore 13 in two parallel planes, and are kept at equally axial spaced relations by the cage 17. Alternatively, rollers (not shown) could be used rather than balls in the cage. When using a roller cage, and when the rollers can be manufactured to be long enough in relation to the length of the ferrule and the connector sleeve, it is sufficient to provide only three rollers. At least one roller or one ball 18a has a diameter differing from that of the others lying in the same cross-sectional area, so that the center point F of the ferrule 14 is always laterally offset with respect to the center point B of the bore 13 of the connector sleeve.

Figure 2:
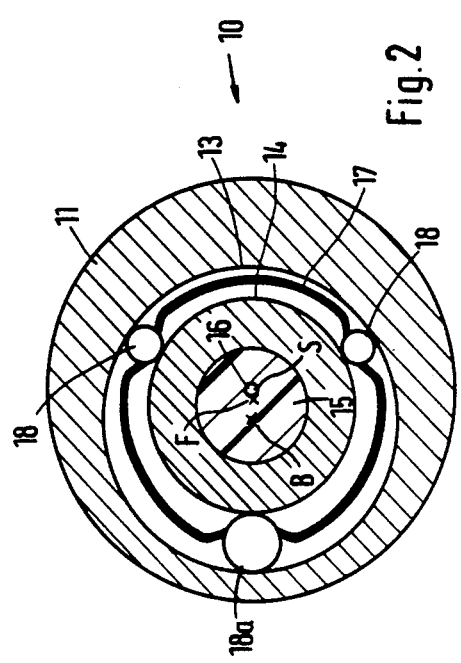
FIG. 2 is an enlarged sectional view taken along line 2—2 of FIG. 1.

By this arrangement, the connector sleeve 11, the roller or ball cage 17, hereinafter briefly referred to as the "cage", and the ferrule 14 can be rotated in relation to one another. This means to imply that there are two degrees of freedom for adjustment, because one part as a reference part is always to be considered as fixed. In this way, the optical axis of the fiber can be shifted within a relatively large range and arbitrarily parallel in relation to itself, so that the fiber core 16 can be brought into congruence with the center point S of the connector sleeve, as is shown in FIG. 2. Now the optical axis of the fiber end is identical to the axis of the connector sleeve. This adjustment is performed under a microscope.

As seen in FIG. 1, the end of the fiber 15 is led into the ferrule 14 from the rear of the ferrule. By surface grinding and polishing, care is taken that the end faces of both the ferrule 14 and the fiber 15 form one single plane. Between the ferrule 14 and the connector sleeve 11 there is arranged the ball cage 17 containing three balls 18 at both its front and rear end. As viewed in FIG. 1, the cross-sectional area at the upper rim of the connector sleeve 11 is distinctly larger than at its lower rim portion, because the axial bore 13 in the connector sleeve 11 intended to receive the ferrule 14 is located eccentrically. In the outer circumference of the connector sleeve 11 there is provided an annular retaining groove 19 in which a spring of the connector may be permitted to engage, as will be explained hereinafter with reference to FIG. 3. For mutually fixing in position the movable parts, such as the connector sleeve 11, the cage 17 and the ferrule 14 of the connector member 10, a grip sleeve 20 is provided at the rear end of the connector sleeve 11. The grip sleeve 20 is provided with threaded bores and screws 21, 22, and 23. Spaced 120° apart from each of the screws 21, 22, and 23, and distributed about the circumference of the grip sleeve 20, there is provided two further screws which, however, are not shown as not lying in the plane of the drawing.

Referring now to FIG. 3, there is shown the entire connector of the invention which comprises a connector receptacle 24 which joins two connector members 10 to one another in such a way that their end-faces will abut one another and the longitudinal axes thereof will be in alignment. Along the connector receptacle 24, and at an equally spaced relation from the center axis thereof, there are provided two bearing rollers 25 and 26 positioned in longitudinal recesses provided for in the inside wall of the connector receptacle 24, and somewhat projecting into the interior space thereof (FIG. 4). The bearing rollers form a two-line bearing common to both connector sleeves 11 to be joined so that the longitudinal axes of the connector sleeves as resting on the bearing rollers, will be in alignment with one another. The two connector sleeves 11 which are thus supported and guided from both sides into the connector receptacle 24 are held together in a position in which the end faces thereof abut against one another by a flat spring 27 whose ends engage in the retaining grooves 19 in the sleeves. This connection, as required, is easily detachable. The flat spring 27 is secured with a screw 28 in the outer surface of the connector receptacle 24. The ends of the spring extend through bores 29 and 30 into the interior of the receptacle 24. If, prior to the mating of the two connector sleeves the optical axis of the fiber in each sleeve has been adjusted to the axis of the sleeve in the way described with reference to FIG. 2, the ends of the fibers as joined to one another according to FIG. 3 will laterally align with one another, thus providing a low loss transfer of light at the connecting point.

What is claimed is:

1. An optical fiber connector member comprising a cylindrical ferrule capable of rotating about its axis and adapted to have an optical fiber mounted eccentrically therein, said ferrule being supported in an eccentric cylindrical bore of a cylindrical connector sleeve so that the axes of said ferrule and said connector sleeve will extend parallel in relation to one another wherein the improvement comprises:

rotatable cage means mounting said ferrule inside said eccentric, cylindrical bore of said connector sleeve;

said rotatable cage means including at least three rotatable circular elements of which at least one has a diameter differing from that of the others; and the axis of said eccentric cylindrical bore of said connector sleeve and the axis of said ferrule are offset laterally with respect to one another.

2. A connector as set forth in claim 1 including:

means for rotatably adjusting all of said ferrule, cage means and connector sleeve relative to each other.

3. A connector for joining one end of an optical fiber to one end of another optical fiber, wherein the mating end of each fiber is sealed uncentered into a cylindrical ferrule capable of rotating about its axis, said ferrule being supported in an eccentric cylindrical connector sleeve so that the axes of said ferrule and said connector sleeve will extend parallel in relation to one another, and a connector receptacle for connecting to one another in proper alignment said cylindrical connector sleeves containing said fiber ends to be joined, wherein the improvement comprises:

rotatable cage means mounting each ferrule inside the eccentric, cylindrical bore of its associated connector sleeve;

said rotatable cage means including at least three rotatable circular elements of which at least one has a diameter differing from that of the others; and the axis of said eccentric, cylindrical bore of said connector sleeve and the axis of said ferrule are offset laterally with respect to one another.

4. A connector as set forth in claim 3 including:

a grip sleeve means for each connector sleeve embodying means for latching with respect to one another; and said ferrule, said cage means, and said connector sleeve are all capable of being rotated in relation to one another.

5. A connector as set forth in claim 3 wherein:

said connector receptacle receives said connector sleeves in its opposite ends in coaxial relationship; and includes snap-action means for retaining said mated connector sleeves in position with the end faces thereof abutting against one another.

* * * * *